Patented Feb. 6, 1951

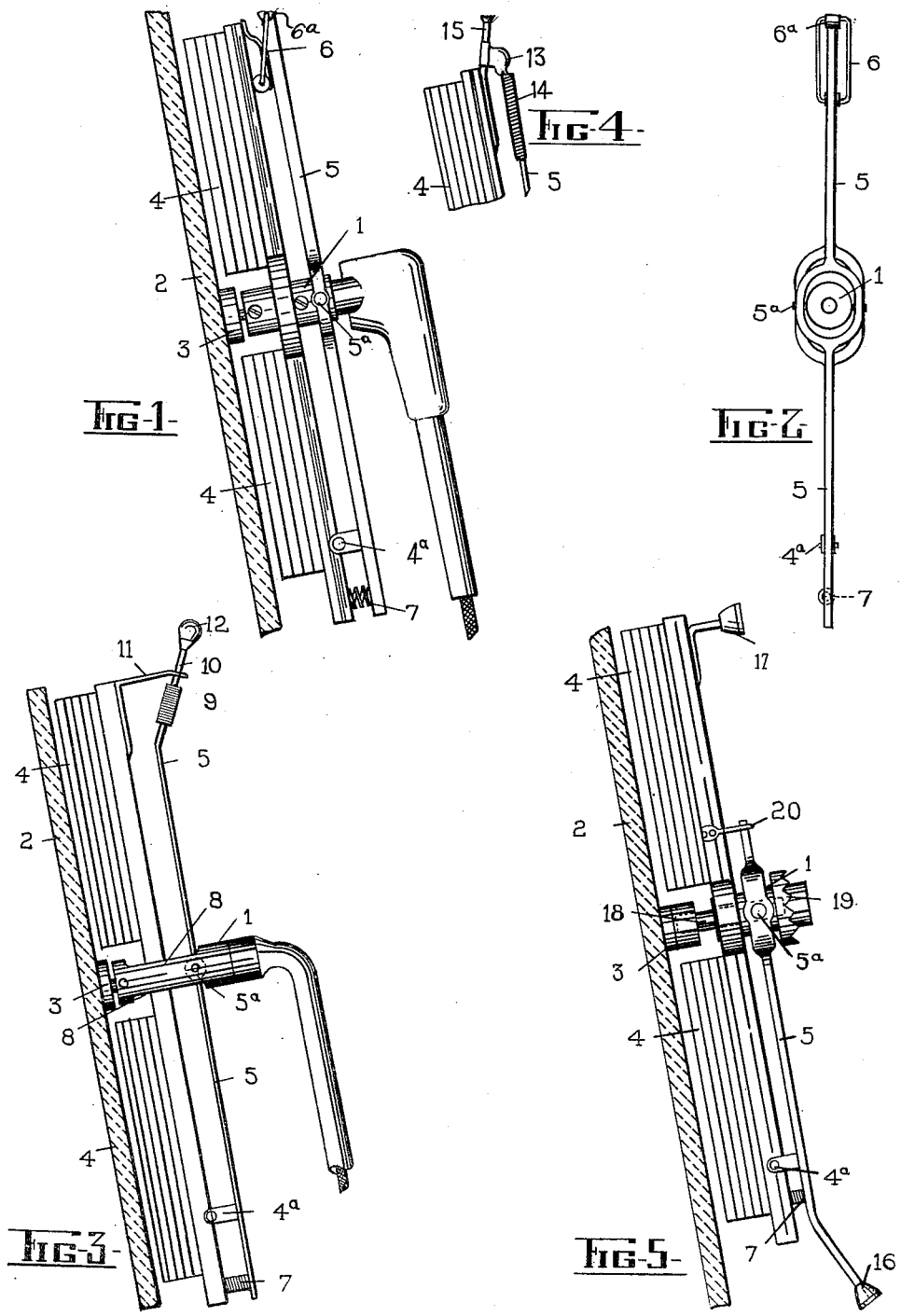

2,540,407

UNITED STATES PATENT OFFICE 2,540,407

WINDSCREEN WIPER

Lily Reed-Lethbridge, New Plymouth, New Zealand, assignor to William Reed-Lethbridge, New Plymouth, New Zealand Application June 26, 1945, Serial No. 601,611
In New Zealand February 26, 1945

9 Claims. (Cl. 15—250)

The invention relates to wind screen wipers used on motor vehicles and elsewhere, for the purpose of ensuring clear vision through said wind screens, for drivers and other persons, requiring to see through same.

Known forms of wind screen wipers, for the aforesaid purpose, comprise the conventional reciprocating or "wig-wag" wiper, and a rotary wiper which includes a rod adapted to be rotated about a point of suspension, and a wiper blade supported by said rod in such a manner that it is capable of limited movement to and from, and in planes parallel to the said rod, whereby when the rod is in operation, the wiper blade is urged by centrifugal action towards the surface it is intended to wipe.

The invention is concerned more particularly with the last described or rotary form of wiper, which does not however make provision for the blade closely following or maintaining wiping contact with the surface to be wiped, should the parallel relationship between same and the rotatable rod vary or be disturbed, as for instance, by hollows or inequalities in said surface, or owing to the wind screen for any reason being caused to change its position or not being set parallel to the blade carrying rod.

The object of the invention, is therefore, to provide an improved form of rotary windscreen wiper, wherein the wiping blade when in operation is enabled to be maintained in close wiping contact over its full length with the surface to be wiped, or to closely follow same notwithstanding inequalities in or changes in position of said surface in relation to the rotary blade carrying rod, owing to the surface not being set parallel to the latter.

The invention consists in providing a wind screen wiper having a rod adapted to be rotated about a point of suspension, and a wiping blade carried by said rod, adapted when the wiper is in operation, to be urged as the result of centrifugal action against the wind screen, characterised by the rod which carries the wiping blade being mounted on the point of suspension, so as to enable said blade to adjust itself to varying angles of inclination of the wind screen surface as it is rotated against same.

The blade carrying rod is mounted so as to be capable of pivoting on the point of suspension, and the wiping blade is connected with the rod and acts on the wind screen surface at each side of the fulcrum of the rod on the point of suspension, means, adapted to act under centrifugal action, being provided to press the wiping blade against the wind screen surface by acting directly on said blade, and also by imparting pivotal movement to the blade carrying rod.

The invention will, however, be more particularly described in conjunction with the accompanying drawing, which illustrates by way of example only different forms the improved wiper can take, but it is to be understood that the invention is not restricted to said forms, as other forms can be employed without departing from the invention.

In the drawing

Figure 1 is an elevation of a form of the invention, in which a weighted pivoted link is utilised to act under centrifugal action for the purpose of imparting rocking movement to the blade carrying rod, portion of a windscreen being shown in section, while Figure 2 is a view of the form of wiper illustrated in Figure 1, from the side opposite the wind screen, and Figure 3 illustrates by means of a similar view to Figure 1 a form of wiper wherein a sliding weight flexibly connected with the blade carrying rod is utilised to act under centrifugal action to impart rocking movement to said rod, Figure 4 being a part elevation illustrating a modification of the form of wiper shown in Figure 3, and Figure 5 illustrates by means of a view similar to Figures 1 and 3 a still further form the wiper can take.

In the form of the invention illustrated in Figure 1 of the drawing, 1 is the wiper head adapted to be supported in close proximity to the wind screen 2, and to be rotated through a flexible or other suitable form of drive, as for instance by the means set forth in U. S. Patent No. 2,246,740, said head 1 being fitted at one end with a button 3 of rubber or other soft material loosely attached to the head 1, so that when the latter is pressed towards the wind screen 2 by the wiper supporting means, the button 3 bears against the wind screen and does not rotate, while permitting the head 1 to be rotated by the driving means provided for the purpose.

The blade 4 which consists of a rigid back and conventional rubber wiping material, extends on both sides of the head 1, as does also the blade carrying rod 5, the latter being pivoted at 5a to said head 1 so as to be capable of having rocking movement thereon, while the blade 4 is pivotally connected with the rod 5, at one side of the head 1, as at 4a.

A link 6 on the rod 5 at the side of the head 1

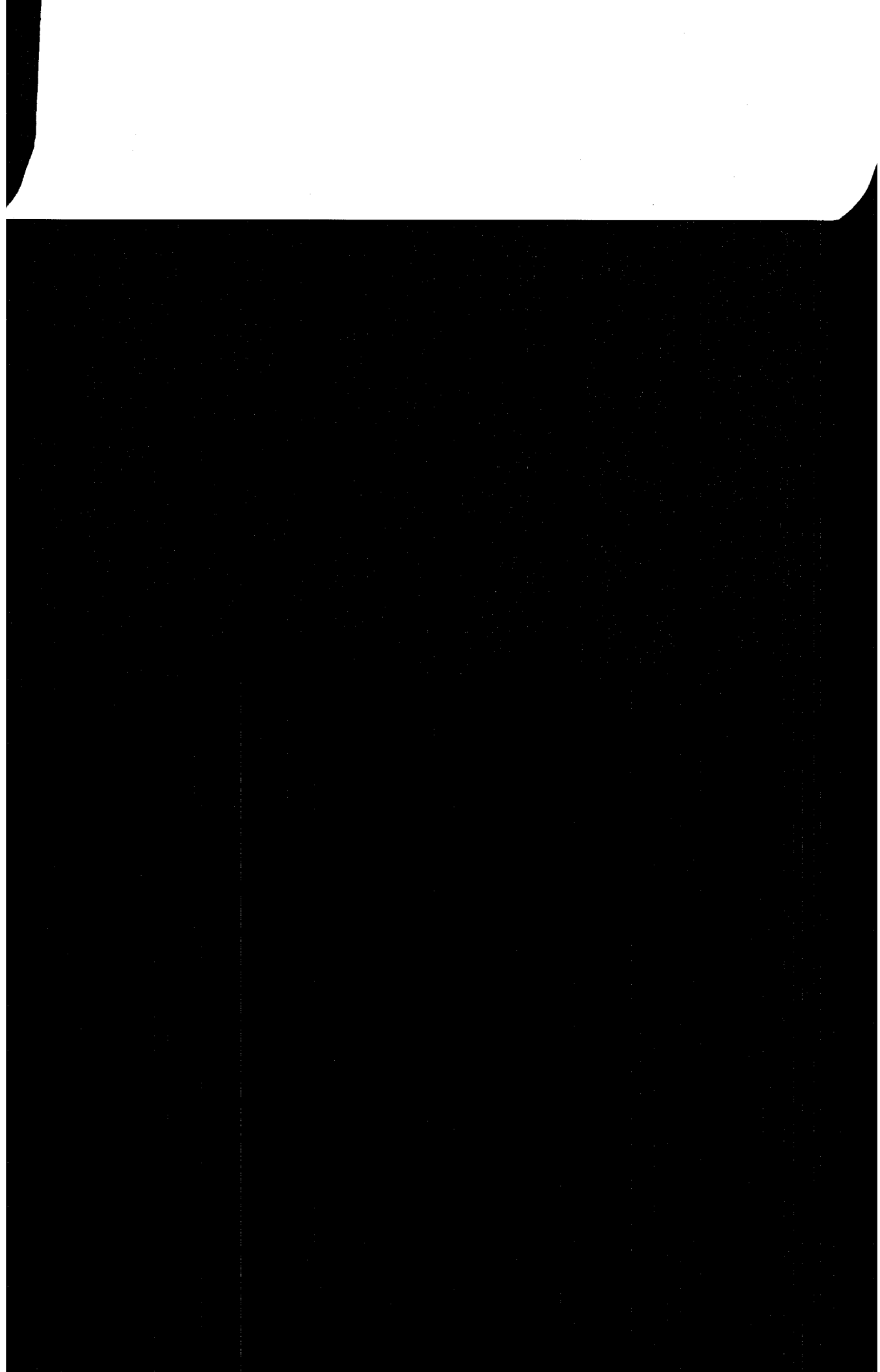

6. A wind screen wiper as claimed in claim 1, wherein said rod rocking means includes masses carried by the blade and the rod and both influenced by centrifugal force.

7. A wind screen wiper as claimed in claim 1, wherein said connecting means is constituted in part by a pivotal connection between the blade and the rod and said rock rocking means includes masses carried by the blade and rod.

8. A wind screen wiper as claimed in claim 1, wherein said rod rocking means includes a centrifugally operated link pivotally connected with the rod and slidably engaging the blade.

9. A wind screen wiper as claimed in claim 1, wherein said rod rocking means includes a mass yieldably connected with the rod.

LILY REED-LETHBRIDGE.

REFERENCES CITED

The following references are of record in the file of this patent:

UNITED STATES PATENTS

| Number | Name | Date |
|---|---|---|
| 1,403,545 | Eibye | Jan. 17, 1922 |
| 2,100,055 | Horton | Nov. 23, 1937 |
| 2,246,740 | Lethbridge | June 24, 1941 |

FOREIGN PATENTS

| Number | Country | Date |
|---|---|---|
| 565,918 | France | Feb. 7, 1924 |
| 514,282 | Great Britain | Nov. 3, 1939 |